US009652653B2

United States Patent
Todeschini et al.

(10) Patent No.: US 9,652,653 B2
(45) Date of Patent: May 16, 2017

(54) ACCELERATION-BASED MOTION TOLERANCE AND PREDICTIVE CODING

(71) Applicant: Hand Held Products, Inc., Fort Mill, SC (US)

(72) Inventors: Erik Todeschini, Camillus, NY (US); James Ledwith, Syracuse, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 14/944,320

(22) Filed: Nov. 18, 2015

(65) Prior Publication Data
US 2016/0188946 A1    Jun. 30, 2016

Related U.S. Application Data

(60) Provisional application No. 62/097,056, filed on Dec. 27, 2014.

(51) Int. Cl.
*G06K 5/04* (2006.01)
*G06K 7/14* (2006.01)
*G06K 7/10* (2006.01)

(52) U.S. Cl.
CPC ....... *G06K 7/1443* (2013.01); *G06K 7/10722* (2013.01); *G06K 7/10821* (2013.01); *G06K 7/1413* (2013.01)

(58) Field of Classification Search
USPC .......................... 235/462.08, 462.09, 462.11
See application file for complete search history.

(56) References Cited

U.S. PATENT DOCUMENTS 5,512,739 A * 4/1996 Chandler ............. G06K 7/1093
235/454
5,708,261 A * 1/1998 Chen ....................... G06K 7/14
235/462.18
(Continued)

FOREIGN PATENT DOCUMENTS

EP    2463803 A1    6/2012
EP    2560127 A2    2/2013
(Continued)

OTHER PUBLICATIONS

European extended Search Report for related EP Application No. 15200213.5, Dated Jul. 1, 2016, 8 pages [Commonly owned references have been cited on separate IDS concurrently filed herewith].
(Continued)

*Primary Examiner* — Ahshik Kim
(74) *Attorney, Agent, or Firm* — Additon, Higgins, & Pendleton, P.A.

(57) ABSTRACT

A method of predicting the location of a region of interest within an image of a scannable object comprising providing a scanner having a processor and an image sensor; sensing in a viewing direction toward a scannable object, with an imaging plane being perpendicular to the viewing direction; capturing an image of the scannable object with the image sensor; sensing motion of the scanner within a motion sensor plane relative to the scannable object, the motion sensor plane being parallel to the imaging plane; outputting a velocity and a movement direction corresponding to the velocity; locating a region of interest in said captured image in response to the velocity and the movement direction; and scanning the captured image beginning with the region of interest.

17 Claims, 7 Drawing Sheets

(56) References Cited

U.S. PATENT DOCUMENTS

| | | | |
|---|---|---|---|
| 6,832,725 | B2 | 12/2004 | Gardiner et al. |
| 7,128,266 | B2 | 10/2006 | Zhu et al. |
| 7,159,783 | B2 | 1/2007 | Walczyk et al. |
| 7,413,127 | B2 | 8/2008 | Ehrhart et al. |
| 7,726,575 | B2 | 6/2010 | Wang et al. |
| 8,294,969 | B2 | 10/2012 | Plesko |
| 8,317,105 | B2 | 11/2012 | Kotlarsky et al. |
| 8,322,622 | B2 | 12/2012 | Liu |
| 8,366,005 | B2 | 2/2013 | Kotlarsky et al. |
| 8,371,507 | B2 | 2/2013 | Haggerty et al. |
| 8,376,233 | B2 | 2/2013 | Van Horn et al. |
| 8,381,979 | B2 | 2/2013 | Franz |
| 8,390,909 | B2 | 3/2013 | Plesko |
| 8,408,464 | B2 | 4/2013 | Zhu et al. |
| 8,408,468 | B2 | 4/2013 | Horn et al. |
| 8,408,469 | B2 | 4/2013 | Good |
| 8,424,768 | B2 | 4/2013 | Rueblinger et al. |
| 8,448,863 | B2 | 5/2013 | Xian et al. |
| 8,457,013 | B2 | 6/2013 | Essinger et al. |
| 8,459,557 | B2 | 6/2013 | Havens et al. |
| 8,469,272 | B2 | 6/2013 | Kearney |
| 8,474,712 | B2 | 7/2013 | Kearney et al. |
| 8,479,992 | B2 | 7/2013 | Kotlarsky et al. |
| 8,490,877 | B2 | 7/2013 | Kearney |
| 8,517,271 | B2 | 8/2013 | Kotlarsky et al. |
| 8,523,076 | B2 | 9/2013 | Good |
| 8,528,818 | B2 | 9/2013 | Ehrhart et al. |
| 8,544,737 | B2 | 10/2013 | Gomez et al. |
| 8,548,420 | B2 | 10/2013 | Grunow et al. |
| 8,550,335 | B2 | 10/2013 | Samek et al. |
| 8,550,354 | B2 | 10/2013 | Gannon et al. |
| 8,550,357 | B2 | 10/2013 | Kearney |
| 8,556,174 | B2 | 10/2013 | Kosecki et al. |
| 8,556,176 | B2 | 10/2013 | Van Horn et al. |
| 8,556,177 | B2 | 10/2013 | Hussey et al. |
| 8,559,767 | B2 | 10/2013 | Barber et al. |
| 8,561,895 | B2 | 10/2013 | Gomez et al. |
| 8,561,903 | B2 | 10/2013 | Sauerwein |
| 8,561,905 | B2 | 10/2013 | Edmonds et al. |
| 8,565,107 | B2 | 10/2013 | Pease et al. |
| 8,571,307 | B2 | 10/2013 | Li et al. |
| 8,579,200 | B2 | 11/2013 | Samek et al. |
| 8,583,924 | B2 | 11/2013 | Caballero et al. |
| 8,584,945 | B2 | 11/2013 | Wang et al. |
| 8,587,595 | B2 | 11/2013 | Wang |
| 8,587,697 | B2 | 11/2013 | Hussey et al. |
| 8,588,869 | B2 | 11/2013 | Sauerwein et al. |
| 8,590,789 | B2 | 11/2013 | Nahill et al. |
| 8,596,539 | B2 | 12/2013 | Havens et al. |
| 8,596,542 | B2 | 12/2013 | Havens et al. |
| 8,596,543 | B2 | 12/2013 | Havens et al. |
| 8,599,271 | B2 | 12/2013 | Havens et al. |
| 8,599,957 | B2 | 12/2013 | Peake et al. |
| 8,600,158 | B2 | 12/2013 | Li et al. |
| 8,600,167 | B2 | 12/2013 | Showering |
| 8,602,309 | B2 | 12/2013 | Longacre et al. |
| 8,608,053 | B2 | 12/2013 | Meier et al. |
| 8,608,071 | B2 | 12/2013 | Liu et al. |
| 8,611,309 | B2 | 12/2013 | Wang et al. |
| 8,615,487 | B2 | 12/2013 | Gomez et al. |
| 8,621,123 | B2 | 12/2013 | Caballero |
| 8,622,303 | B2 | 1/2014 | Meier et al. |
| 8,628,013 | B2 | 1/2014 | Ding |
| 8,628,015 | B2 | 1/2014 | Wang et al. |
| 8,628,016 | B2 | 1/2014 | Winegar |
| 8,629,926 | B2 | 1/2014 | Wang |
| 8,630,491 | B2 | 1/2014 | Longacre et al. |
| 8,635,309 | B2 | 1/2014 | Berthiaume et al. |
| 8,636,200 | B2 | 1/2014 | Kearney |
| 8,636,212 | B2 | 1/2014 | Nahill et al. |
| 8,636,215 | B2 | 1/2014 | Ding et al. |
| 8,636,224 | B2 | 1/2014 | Wang |
| 8,638,806 | B2 | 1/2014 | Wang et al. |
| 8,640,958 | B2 | 2/2014 | Lu et al. |
| 8,640,960 | B2 | 2/2014 | Wang et al. |
| 8,643,717 | B2 | 2/2014 | Li et al. |
| 8,646,692 | B2 | 2/2014 | Meier et al. |
| 8,646,694 | B2 | 2/2014 | Wang et al. |
| 8,657,200 | B2 | 2/2014 | Ren et al. |
| 8,659,397 | B2 | 2/2014 | Vargo et al. |
| 8,668,149 | B2 | 3/2014 | Good |
| 8,678,285 | B2 | 3/2014 | Kearney |
| 8,678,286 | B2 | 3/2014 | Smith et al. |
| 8,682,077 | B1 | 3/2014 | Longacre |
| D702,237 | S | 4/2014 | Oberpriller et al. |
| 8,687,282 | B2 | 4/2014 | Feng et al. |
| 8,692,927 | B2 | 4/2014 | Pease et al. |
| 8,695,880 | B2 | 4/2014 | Bremer et al. |
| 8,698,949 | B2 | 4/2014 | Grunow et al. |
| 8,702,000 | B2 | 4/2014 | Barber et al. |
| 8,717,494 | B2 | 5/2014 | Gannon |
| 8,720,783 | B2 | 5/2014 | Biss et al. |
| 8,723,804 | B2 | 5/2014 | Fletcher et al. |
| 8,723,904 | B2 | 5/2014 | Marty et al. |
| 8,727,223 | B2 | 5/2014 | Wang |
| 8,740,082 | B2 | 6/2014 | Wilz |
| 8,740,085 | B2 | 6/2014 | Furlong et al. |
| 8,746,563 | B2 | 6/2014 | Hennick et al. |
| 8,750,445 | B2 | 6/2014 | Peake et al. |
| 8,752,766 | B2 | 6/2014 | Xian et al. |
| 8,756,059 | B2 | 6/2014 | Braho et al. |
| 8,757,495 | B2 | 6/2014 | Qu et al. |
| 8,760,563 | B2 | 6/2014 | Koziol et al. |
| 8,763,909 | B2 | 7/2014 | Reed et al. |
| 8,777,108 | B2 | 7/2014 | Coyle |
| 8,777,109 | B2 | 7/2014 | Oberpriller et al. |
| 8,779,898 | B2 | 7/2014 | Havens et al. |
| 8,781,520 | B2 | 7/2014 | Payne et al. |
| 8,783,573 | B2 | 7/2014 | Havens et al. |
| 8,789,757 | B2 | 7/2014 | Barten |
| 8,789,758 | B2 | 7/2014 | Hawley et al. |
| 8,789,759 | B2 | 7/2014 | Xian et al. |
| 8,794,520 | B2 | 8/2014 | Wang et al. |
| 8,794,522 | B2 | 8/2014 | Ehrhart |
| 8,794,525 | B2 | 8/2014 | Amundsen et al. |
| 8,794,526 | B2 | 8/2014 | Wang et al. |
| 8,798,367 | B2 | 8/2014 | Ellis |
| 8,807,431 | B2 | 8/2014 | Wang et al. |
| 8,807,432 | B2 | 8/2014 | Van Horn et al. |
| 8,820,630 | B2 | 9/2014 | Qu et al. |
| 8,822,848 | B2 | 9/2014 | Meagher |
| 8,824,692 | B2 | 9/2014 | Sheerin et al. |
| 8,824,696 | B2 | 9/2014 | Braho |
| 8,842,849 | B2 | 9/2014 | Wahl et al. |
| 8,844,822 | B2 | 9/2014 | Kotlarsky et al. |
| 8,844,823 | B2 | 9/2014 | Fritz et al. |
| 8,849,019 | B2 | 9/2014 | Li et al. |
| D716,285 | S | 10/2014 | Chaney et al. |
| 8,851,383 | B2 | 10/2014 | Yeakley et al. |
| 8,854,633 | B2 | 10/2014 | Laffargue |
| 8,866,963 | B2 | 10/2014 | Grunow et al. |
| 8,868,421 | B2 | 10/2014 | Braho et al. |
| 8,868,519 | B2 | 10/2014 | Maloy et al. |
| 8,868,802 | B2 | 10/2014 | Barten |
| 8,868,803 | B2 | 10/2014 | Caballero |
| 8,870,074 | B1 | 10/2014 | Gannon |
| 8,879,639 | B2 | 11/2014 | Sauerwein |
| 8,880,426 | B2 | 11/2014 | Smith |
| 8,881,983 | B2 | 11/2014 | Havens et al. |
| 8,881,987 | B2 | 11/2014 | Wang |
| 8,903,172 | B2 | 12/2014 | Smith |
| 8,908,995 | B2 | 12/2014 | Benos et al. |
| 8,910,870 | B2 | 12/2014 | Li et al. |
| 8,910,875 | B2 | 12/2014 | Ren et al. |
| 8,914,290 | B2 | 12/2014 | Hendrickson et al. |
| 8,914,788 | B2 | 12/2014 | Pettinelli et al. |
| 8,915,439 | B2 | 12/2014 | Feng et al. |
| 8,915,444 | B2 | 12/2014 | Havens et al. |
| 8,916,789 | B2 | 12/2014 | Woodburn |
| 8,918,250 | B2 | 12/2014 | Hollifield |
| 8,918,564 | B2 | 12/2014 | Caballero |
| 8,925,818 | B2 | 1/2015 | Kosecki et al. |
| 8,939,374 | B2 | 1/2015 | Jovanovski et al. |
| 8,942,480 | B2 | 1/2015 | Ellis |

(56) References Cited

U.S. PATENT DOCUMENTS

| | | | |
|---|---|---|---|
| 8,944,313 | B2 | 2/2015 | Williams et al. |
| 8,944,327 | B2 | 2/2015 | Meier et al. |
| 8,944,332 | B2 | 2/2015 | Harding et al. |
| 8,950,678 | B2 | 2/2015 | Germaine et al. |
| D723,560 | S | 3/2015 | Zhou et al. |
| 8,967,468 | B2 | 3/2015 | Gomez et al. |
| 8,971,346 | B2 | 3/2015 | Sevier |
| 8,976,030 | B2 | 3/2015 | Cunningham et al. |
| 8,976,368 | B2 | 3/2015 | Akel et al. |
| 8,978,981 | B2 | 3/2015 | Guan |
| 8,978,983 | B2 | 3/2015 | Bremer et al. |
| 8,978,984 | B2 | 3/2015 | Hennick et al. |
| 8,985,456 | B2 | 3/2015 | Zhu et al. |
| 8,985,457 | B2 | 3/2015 | Soule et al. |
| 8,985,459 | B2 | 3/2015 | Kearney et al. |
| 8,985,461 | B2 | 3/2015 | Gelay et al. |
| 8,988,578 | B2 | 3/2015 | Showering |
| 8,988,590 | B2 | 3/2015 | Gillet et al. |
| 8,991,704 | B2 | 3/2015 | Hopper et al. |
| 8,996,194 | B2 | 3/2015 | Davis et al. |
| 8,996,384 | B2 | 3/2015 | Funyak et al. |
| 8,998,091 | B2 | 4/2015 | Edmonds et al. |
| 9,002,641 | B2 | 4/2015 | Showering |
| 9,007,368 | B2 | 4/2015 | Laffargue et al. |
| 9,010,641 | B2 | 4/2015 | Qu et al. |
| 9,015,513 | B2 | 4/2015 | Murawski et al. |
| 9,016,576 | B2 | 4/2015 | Brady et al. |
| D730,357 | S | 5/2015 | Fitch et al. |
| 9,022,288 | B2 | 5/2015 | Nahill et al. |
| 9,030,964 | B2 | 5/2015 | Essinger et al. |
| 9,033,240 | B2 | 5/2015 | Smith et al. |
| 9,033,242 | B2 | 5/2015 | Gillet et al. |
| 9,036,054 | B2 | 5/2015 | Koziol et al. |
| 9,037,344 | B2 | 5/2015 | Chamberlin |
| 9,038,911 | B2 | 5/2015 | Xian et al. |
| 9,038,915 | B2 | 5/2015 | Smith |
| D730,901 | S | 6/2015 | Oberpriller et al. |
| D730,902 | S | 6/2015 | Fitch et al. |
| D733,112 | S | 6/2015 | Chaney et al. |
| 9,047,098 | B2 | 6/2015 | Barten |
| 9,047,359 | B2 | 6/2015 | Caballero et al. |
| 9,047,420 | B2 | 6/2015 | Caballero |
| 9,047,525 | B2 | 6/2015 | Barber |
| 9,047,531 | B2 | 6/2015 | Showering et al. |
| 9,049,640 | B2 | 6/2015 | Wang et al. |
| 9,053,055 | B2 | 6/2015 | Caballero |
| 9,053,378 | B1 | 6/2015 | Hou et al. |
| 9,053,380 | B2 | 6/2015 | Xian et al. |
| 9,057,641 | B2 | 6/2015 | Amundsen et al. |
| 9,058,526 | B2 | 6/2015 | Powilleit |
| 9,064,165 | B2 | 6/2015 | Havens et al. |
| 9,064,167 | B2 | 6/2015 | Xian et al. |
| 9,064,168 | B2 | 6/2015 | Todeschini et al. |
| 9,064,254 | B2 | 6/2015 | Todeschini et al. |
| 9,066,032 | B2 | 6/2015 | Wang |
| 9,070,032 | B2 | 6/2015 | Corcoran |
| D734,339 | S | 7/2015 | Zhou et al. |
| D734,751 | S | 7/2015 | Oberpriller et al. |
| 9,082,023 | B2 | 7/2015 | Feng et al. |
| 2007/0063048 | A1 | 3/2007 | Havens et al. |
| 2009/0134221 | A1 | 5/2009 | Zhu et al. |
| 2010/0177076 | A1 | 7/2010 | Essinger et al. |
| 2010/0177080 | A1 | 7/2010 | Essinger et al. |
| 2010/0177707 | A1 | 7/2010 | Essinger et al. |
| 2010/0177749 | A1 | 7/2010 | Essinger et al. |
| 2011/0169999 | A1 | 7/2011 | Grunow et al. |
| 2011/0202554 | A1 | 8/2011 | Powilleit et al. |
| 2012/0111946 | A1 | 6/2012 | Golant |
| 2012/0150589 | A1* | 6/2012 | Xian ................ G06K 7/10128 705/7.42 |
| 2012/0168512 | A1 | 7/2012 | Kotlarsky et al. |
| 2012/0193423 | A1 | 8/2012 | Samek |
| 2012/0203647 | A1 | 8/2012 | Smith |
| 2012/0223141 | A1 | 9/2012 | Good et al. |
| 2013/0043312 | A1 | 2/2013 | Van Horn |
| 2013/0075168 | A1 | 3/2013 | Amundsen et al. |
| 2013/0112750 | A1* | 5/2013 | Negro ................ G06K 7/10871 235/454 |
| 2013/0175341 | A1 | 7/2013 | Kearney et al. |
| 2013/0175343 | A1 | 7/2013 | Good |
| 2013/0206831 | A1* | 8/2013 | Basler ............... G06F 17/30002 235/375 |
| 2013/0257744 | A1 | 10/2013 | Daghigh et al. |
| 2013/0257759 | A1 | 10/2013 | Daghigh |
| 2013/0270346 | A1 | 10/2013 | Xian et al. |
| 2013/0287258 | A1 | 10/2013 | Kearney |
| 2013/0292475 | A1 | 11/2013 | Kotlarsky et al. |
| 2013/0292477 | A1 | 11/2013 | Hennick et al. |
| 2013/0293539 | A1 | 11/2013 | Hunt et al. |
| 2013/0293540 | A1 | 11/2013 | Laffargue et al. |
| 2013/0306728 | A1 | 11/2013 | Thuries et al. |
| 2013/0306731 | A1 | 11/2013 | Pedraro |
| 2013/0307964 | A1 | 11/2013 | Bremer et al. |
| 2013/0308625 | A1 | 11/2013 | Park et al. |
| 2013/0313324 | A1 | 11/2013 | Koziol et al. |
| 2013/0313325 | A1 | 11/2013 | Wilz et al. |
| 2013/0342717 | A1 | 12/2013 | Havens et al. |
| 2014/0001267 | A1 | 1/2014 | Giordano et al. |
| 2014/0002828 | A1 | 1/2014 | Laffargue et al. |
| 2014/0008439 | A1 | 1/2014 | Wang |
| 2014/0025584 | A1 | 1/2014 | Liu et al. |
| 2014/0034734 | A1 | 2/2014 | Sauerwein |
| 2014/0036848 | A1 | 2/2014 | Pease et al. |
| 2014/0039693 | A1 | 2/2014 | Havens et al. |
| 2014/0042814 | A1 | 2/2014 | Kather et al. |
| 2014/0049120 | A1 | 2/2014 | Kohtz et al. |
| 2014/0049635 | A1 | 2/2014 | Laffargue et al. |
| 2014/0061305 | A1 | 3/2014 | Nahill et al. |
| 2014/0061306 | A1 | 3/2014 | Wu et al. |
| 2014/0063289 | A1 | 3/2014 | Hussey et al. |
| 2014/0066136 | A1 | 3/2014 | Sauerwein et al. |
| 2014/0067692 | A1 | 3/2014 | Ye et al. |
| 2014/0070005 | A1 | 3/2014 | Nahill et al. |
| 2014/0071840 | A1 | 3/2014 | Venancio |
| 2014/0074746 | A1 | 3/2014 | Wang |
| 2014/0076974 | A1 | 3/2014 | Havens et al. |
| 2014/0078341 | A1 | 3/2014 | Havens et al. |
| 2014/0078342 | A1 | 3/2014 | Li et al. |
| 2014/0078345 | A1 | 3/2014 | Showering |
| 2014/0098792 | A1 | 4/2014 | Wang et al. |
| 2014/0100774 | A1 | 4/2014 | Showering |
| 2014/0100813 | A1 | 4/2014 | Showering |
| 2014/0103115 | A1 | 4/2014 | Meier et al. |
| 2014/0104413 | A1 | 4/2014 | McCloskey et al. |
| 2014/0104414 | A1 | 4/2014 | McCloskey et al. |
| 2014/0104416 | A1 | 4/2014 | Giordano et al. |
| 2014/0104451 | A1 | 4/2014 | Todeschini et al. |
| 2014/0106594 | A1 | 4/2014 | Skvoretz |
| 2014/0106725 | A1 | 4/2014 | Sauerwein |
| 2014/0108010 | A1 | 4/2014 | Maltseff et al. |
| 2014/0108402 | A1 | 4/2014 | Gomez et al. |
| 2014/0108682 | A1 | 4/2014 | Caballero |
| 2014/0110485 | A1 | 4/2014 | Toa et al. |
| 2014/0114530 | A1 | 4/2014 | Fitch et al. |
| 2014/0124577 | A1 | 5/2014 | Wang et al. |
| 2014/0124579 | A1 | 5/2014 | Ding |
| 2014/0125842 | A1 | 5/2014 | Winegar |
| 2014/0125853 | A1 | 5/2014 | Wang |
| 2014/0125999 | A1 | 5/2014 | Longacre et al. |
| 2014/0129378 | A1 | 5/2014 | Richardson |
| 2014/0131438 | A1 | 5/2014 | Kearney |
| 2014/0131441 | A1 | 5/2014 | Nahill et al. |
| 2014/0131443 | A1 | 5/2014 | Smith |
| 2014/0131444 | A1 | 5/2014 | Wang |
| 2014/0131445 | A1 | 5/2014 | Ding et al. |
| 2014/0131448 | A1 | 5/2014 | Xian et al. |
| 2014/0133379 | A1 | 5/2014 | Wang et al. |
| 2014/0136208 | A1 | 5/2014 | Maltseff et al. |
| 2014/0140585 | A1 | 5/2014 | Wang |
| 2014/0151453 | A1 | 6/2014 | Meier et al. |
| 2014/0152882 | A1 | 6/2014 | Samek et al. |
| 2014/0158770 | A1 | 6/2014 | Sevier et al. |
| 2014/0159869 | A1 | 6/2014 | Zumsteg et al. |
| 2014/0166755 | A1 | 6/2014 | Liu et al. |

(56) References Cited

U.S. PATENT DOCUMENTS

| | | |
|---|---|---|
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |

FOREIGN PATENT DOCUMENTS

| | | |
|---|---|---|
| WO | 2013163789 A1 | 11/2013 |
| WO | 2013173985 A1 | 11/2013 |
| WO | 2014019130 A1 | 2/2014 |
| WO | 2014110495 A1 | 7/2014 |

OTHER PUBLICATIONS

U.S. Appl. No. 14/519,179 for Dimensioning System With Multipath Interference Mitigation, filed Oct. 21, 2014 (Thuries et al.); 30 pages.

U.S. Appl. No. 14/264,173 for Autofocus Lens System for Indicia Readers filed Apr. 29, 2014, (Ackley et al.); 39 pages.

U.S. Appl. No. 14/453,019 for Dimensioning System With Guided Alignment, filed Aug. 6, 2014 (Li et al.); 31 pages.

U.S. Appl. No. 14/452,697 for Interactive Indicia Reader, filed Aug. 6, 2014, (Todeschini); 32 pages.

U.S. Appl. No. 14/321,898 for Hand-Mounted Indicia-Reading Device with Finger Motion Triggering filed Apr. 1, 2014 (Van Horn et al.); 36 pages.

U.S. Appl. No. 14/715,916 for Evaluating Image Values filed May 19, 2015 (Ackley); 60 pages.

U.S. Appl. No. 14/513,808 for Identifying Inventory Items in a Storage Facility filed Oct. 14, 2014 (Singel et al.); 51 pages.

U.S. Appl. No. 29/458,405 for an Electronic Device, filed Jun. 19, 2013 (Finch et al.); 22 pages.

U.S. Appl. No. 29/459,620 for an Electronic Device Enclosure, filed Jul. 2, 2013 (London et al.); 21 pages.

U.S. Appl. No. 14/483,056 for Variable Depth of Field Barcode Scanner filed Sep. 10, 2014 (McCloskey et al.); 29 pages.

U.S. Appl. No. 14/531,154 for Detecting an Inspector Through an Inspection filed Nov. 3, 2014 (Miller et al.); 53 pages.

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 14/340,627 for an Axially Reinforced Flexible Scan Element, filed Jul. 25, 2014 (Reublinger et al.); 41 pages.

U.S. Appl. No. 14/676,327 for Device Management Proxy for Secure Devices filed Apr. 1, 2015 (Yeakley et al.); 50 pages.

U.S. Appl. No. 14/257,364 for Docking System and Method Using Near Field Communication filed Apr. 21, 2014 (Showering); 31 pages.

U.S. Appl. No. 14/327,827 for a Mobile-Phone Adapter for Electronic Transactions, filed Jul. 10, 2014 (Hejl); 25 pages.

U.S. Appl. No. 14/334,934 for a System and Method for Indicia Verification, filed Jul. 18, 2014 (Hejl); 38 pages.

U.S. Appl. No. 29/530,600 for Cyclone filed Jun. 18, 2015 (Vargo et al); 16 pages.

(56) References Cited

OTHER PUBLICATIONS

U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages.
U.S. Appl. No. 14/619,093 for Methods for Training a Speech Recognition System filed Feb. 11, 2015 (Pecorari); 35 pages.
U.S. Appl. No. 29/524,186 for Scanner filed Apr. 17, 2015 (Zhou et al.); 17 pages.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/614,706 for Device for Supporting an Electronic Tool on a User's Hand filed Feb. 5, 2015 (Oberpriller et al.); 33 pages.
U.S. Appl. No. 14/628,708 for Device, System, and Method for Determining the Status of Checkout Lanes filed Feb. 23, 2015 (Todeschini); 37 pages.
U.S. Appl. No. 14/704,050 for Intermediate Linear Positioning filed May 5, 2015 (Charpentier et al.); 60 pages.
U.S. Appl. No. 14/529,563 for Adaptable Interface for a Mobile Computing Device filed Oct. 31, 2014 (Schoon et al.); 36 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/695,364 for Medication Management System filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/735,717 for Indicia-Reading Systems Having an Interface With a User's Nervous System filed Jun. 10, 2015 (Todeschini); 39 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/535,764 for Concatenated Expected Responses for Speech Recognition filed Nov. 7, 2014 (Braho et al.); 51 pages.
U.S. Appl. No. 14/687,289 for System for Communication Via a Peripheral Hub filed Apr. 15, 2015 (Kohtz et al.); 37 pages.
U.S. Appl. No. 14/747,197 for Optical Pattern Projector filed Jun. 23, 2015 (Thuries et al.); 33 pages.
U.S. Appl. No. 14/674,329 for Aimer for Barcode Scanning filed Mar. 31, 2015 (Bidwell); 36 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/695,923 for Secure Unattended Network Authentication filed Apr. 24, 2015 (Kubler et al.); 52 pages.
U.S. Appl. No. 14/740,373 for Calibrating a Volume Dimensioner filed Jun. 16, 2015 (Ackley et al.); 63 pages.
U.S. Appl. No. 13/367,978, filed Feb. 7, 2012, (Feng et al.); now abandoned.
U.S. Appl. No. 14/462,801 for Mobile Computing Device With Data Cognition Software, filed Aug. 19, 2014 (Todeschini et al.); 38 pages.
U.S. Appl. No. 14/596,757 for System and Method for Detecting Barcode Printing Errors filed Jan. 14, 2015 (Ackley); 41 pages.
U.S. Appl. No. 14/277,337 for Multipurpose Optical Reader, filed May 14, 2014 (Jovanovski et al.); 59 pages.
U.S. Appl. No. 14/200,405 for Indicia Reader for Size-Limited Applications tiled Mar. 7, 2014 (Feng et al.); 42 pages.
U.S. Appl. No. 14/662,922 for Multifunction Point of Sale System filed Mar. 19, 2015 (Van Horn et al.); 41 pages.
U.S. Appl. No. 14/446,391 for Multifunction Point of Sale Apparatus With Optical Signature Capture filed Jul. 30, 2014 (Good et al.); 37 pages.
U.S. Appl. No. 29/528,165 for In-Counter Barcode Scanner filed May 27, 2015 (Oberpriller et al.); 13 pages.
U.S. Appl. No. 29/528,890 for Mobile Computer Housing filed Jun. 2, 2015 (Fitch et al.); 61 pages.
U.S. Appl. No. 14/614,796 for Cargo Apportionment Techniques filed Feb. 5, 2015 (Morton et al.); 56 pages.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 14/578,627 for Safety System and Method filed Dec. 22, 2014 (Ackley et al.); 32 pages.
U.S. Appl. No. 14/573,022 for Dynamic Diagnostic Indicator Generation filed Dec. 17, 2014 (Goldsmith); 43 pages.
U.S. Appl. No. 14/529,857 for Barcode Reader With Security Features filed Oct. 31, 2014 (Todeschini et al.); 32 pages.
U.S. Appl. No. 14/519,195 for Handheld Dimensioning System With Feedback filed Oct. 21, 2014 (Laffargue et al.); 39 pages.
U.S. Appl. No. 14/519,211 for System and Method for Dimensioning filed Oct. 21, 2014 (Ackley et al.); 33 pages.
U.S. Appl. No. 14/519,233 for Handheld Dimensioner With Data-Quality Indication filed Oct. 21, 2014 (Laffargue et al.); 36 pages.
U.S. Appl. No. 14/533,319 for Barcode Scanning System Using Wearable Device With Embedded Camera filed Nov. 5, 2014 (Todeschini); 29 pages.
U.S. Appl. No. 14/748,446 for Cordless Indicia Reader With a Multifunction Coil for Wireless Charging and EAS Deactivation, filed Jun. 24, 2015 (Xie et al.); 34 pages.
U.S. Appl. No. 29/528,590 for Electronic Device filed May 29, 2015 (Fitch et al.); 9 pages.
U.S. Appl. No. 14/519,249 for Handheld Dimensioning System With Measurement-Conformance Feedback filed Oct. 21, 2014 (Ackley et al.); 36 pages.
U.S. Appl. No. 29/519,017 for Scanner filed Mar. 2, 2015 (Zhou et al.); 11 pages.
U.S. Appl. No. 14/398,542 for Portable Electronic Devices Having a Separate Location Trigger Unit for Use in Controlling an Application Unit filed Nov. 3, 2014 (Bian et al.); 22 pages.
U.S. Appl. No. 14/405,278 for Design Pattern for Secure Store filed Mar. 9, 2015 (Zhu et al.); 23 pages.
U.S. Appl. No. 14/590,024 for Shelving and Package Locating Systems for Delivery Vehicles filed Jan. 6, 2015 (Payne); 31 pages.
U.S. Appl. No. 14/568,305 for Auto-Contrast Viewfinder for an Indicia Reader filed Dec. 12, 2014 (Todeschini); 29 pages.
U.S. Appl. No. 29/526,918 for Charging Base filed May 14, 2015 (Fitch et al.); 10 pages.
U.S. Appl. No. 14/580,262 for Media Gate for Thermal Transfer Printers filed Dec. 23, 2014 (Bowles); 36 pages.

* cited by examiner

ACCELERATION-BASED MOTION TOLERANCE AND PREDICTIVE CODING

CROSS-REFERENCE TO RELATED APPLICATION

The present application claims the benefit of U.S. Patent Application No. 62/097,056 for Acceleration-Based Motion Tolerance and Predictive Coding filed Dec. 27, 2014, which is hereby incorporated by reference in its entirety.

FIELD OF THE INVENTION

The invention is generally related to barcode scanners, and, more particularly, to portable barcode scanners imbedded in smartphone devices or portable data terminals.

BACKGROUND

Conventional barcode scanners decode a barcode when the barcode passes through the center of a field of view of the sensor. However, these conventional barcode scanners have limited acceleration-based motion tolerance, often failing to decode a barcode or other decodable indicia when the barcode rapidly passes through the center of the field of view of the sensor, particularly when the barcode scanner is a portable data terminal (PDT) or a smartphone device.

SUMMARY

In an aspect of the invention, a method of predicting the location of a region of interest within an image of a scannable object comprises: providing a scanner having a processor and an image sensor; sensing in a viewing direction toward a scannable object, with an imaging plane being perpendicular to the viewing direction; capturing an image of the scannable object with the image sensor; sensing motion of the scanner within a motion sensor plane relative to the scannable object, the motion sensor plane being parallel to the imaging plane; outputting a velocity and a movement direction corresponding to the velocity; locating a region of interest in said captured image in response to the velocity and the movement direction; and scanning the captured image beginning with the region of interest.

In an embodiment, the step of locating the region of interest comprises: when no motion is detected, locating the region of interest in the center of the captured image; and when motion is detected, locating the region of interest in an offset direction from the center of the captured image and towards an edge of the captured image, with the offset direction being substantially parallel to the movement direction.

In another embodiment, the step of locating the region of interest comprises: when motion is detected, locating the region of interest at an offset distance measured from the center of the image, the offset distance being proportional to the velocity.

In an embodiment, the method comprises: providing a light source; configuring the light source to direct light in the viewing direction; configuring the light source to be selectively in one of: a deactivated state, and an activated state; and activating the light source when motion is detected.

In another embodiment, the method comprises providing a light source; configuring the light source to direct light in the viewing direction; configuring the light source to be selectively in one of: a deactivated state, and an activated state; and activating the light source when motion is detected.

In another embodiment, the method comprises the steps of: providing a light source; configuring the light source to direct light in the viewing direction; configuring the light source to be selectively in one of: a deactivated state, and an activated state; and activating the light source when motion is detected.

In an embodiment, the method comprises defining an imaging distance corresponding to the distance between the image sensor and the scannable object; defining an exposure time for the image sensor; and estimating the velocity based on the exposure time and the imaging distance.

In another embodiment, the method comprises: defining an imaging distance corresponding to the distance between the image sensor and the scannable object; defining an exposure time for the image sensor; and estimating the velocity based on the exposure time and the imaging distance.

In another embodiment, the method comprises: defining an imaging distance corresponding to the distance between the image sensor and the scannable object; defining an exposure time for the image sensor; and estimating the velocity based on the exposure time and the imaging distance.

In an embodiment, the method comprises: setting a gain and an exposure time for the image sensor; and when motion is detected, either increasing the gain or lowering the exposure time.

In another embodiment, the method comprises: setting a gain and an exposure time for the image sensor; and when motion is detected, either increasing the gain or lowering the exposure time.

In an embodiment, the method comprises: setting a gain and an exposure time for the image sensor; and when motion is detected, either increasing the gain or lowering the exposure time.

In an embodiment, the step of sensing motion comprises: capturing at least two images of the scannable object, the at least two images being separated by a time interval; and determining movement direction and velocity by measuring a distance traveled by the scannable object between the at least two images.

In an embodiment, the step of sensing motion comprises: capturing at least two images of the scannable object, the at least two images being separated by a time interval; and determining movement direction and velocity by measuring a distance traveled by the scannable object between the at least two images.

In an embodiment, the step of sensing motion comprises: capturing at least two images of the scannable object, the at least two images being separated by a time interval; and determining movement direction and velocity by measuring a distance traveled by the scannable object between the at least two images.

In an embodiment, the step of sensing motion comprises: capturing at least an image of the scannable object; and determining movement direction and velocity by measuring a blurred area of a scannable object in an image.

In another embodiment, the step of sensing motion comprises: capturing at least an image of the scannable object; and determining movement direction and velocity by measuring a blurred area of a scannable object in an image.

In another embodiment, the step of sensing motion comprises: capturing at least an image of the scannable object;

and determining movement direction and velocity by measuring a blurred area of a scannable object in an image.

BRIEF DESCRIPTION OF THE DRAWINGS

The invention will now be described by way of example, with reference to that accompanying Figures, of which.

DETAILED DESCRIPTION

An acceleration-based motion tolerance and predictive coding method 10 will be described with reference to the embodiments shown in FIGS. 1-7. As will hereinafter be more fully described, the acceleration-based motion tolerance and predictive coding method 10 allows a user to operate a scanner more quickly and efficiently to scan codes.

The following disclosure provides a system and a method for predicting the location of a region of interest within an image of a scannable object. This acceleration-based motion tolerance and predictive coding method and system are particularly useful for locating and scanning barcodes and other decodable indicia known to those of ordinary skill in the art, but the method and system are also useful for scanning other objects. For example, the invention could be applied to object location, facial recognition, and other applications of image processing.

Figure 1:
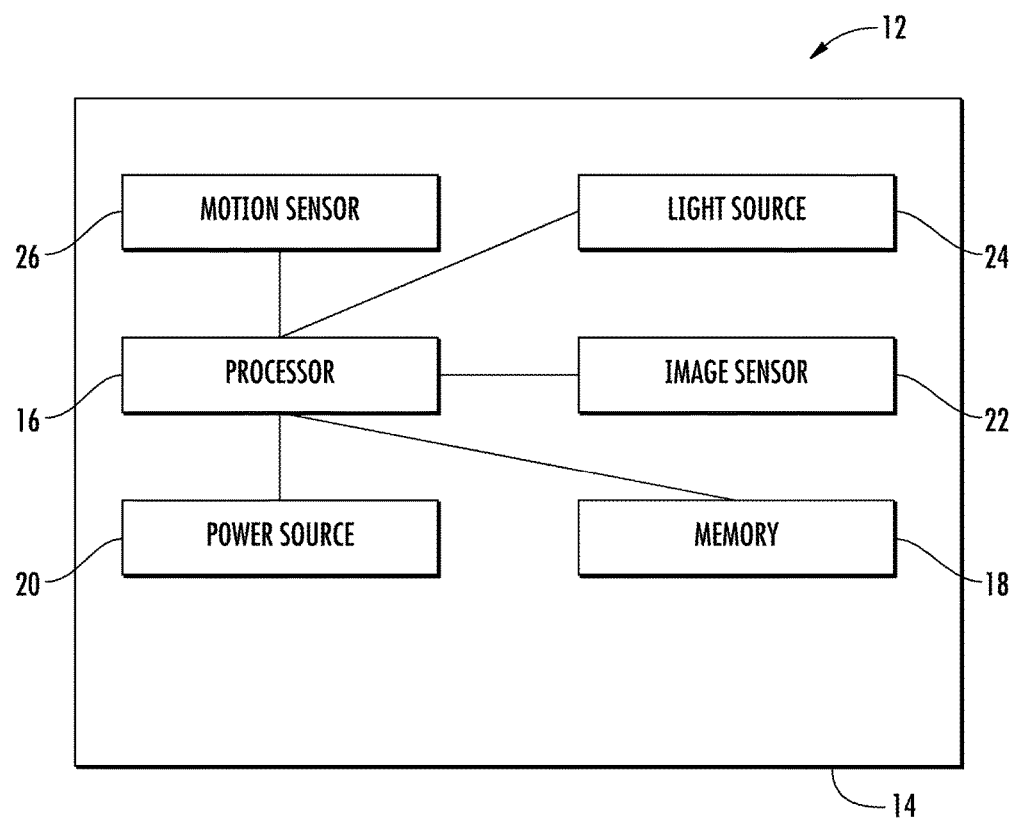
FIG. 1 is a schematic diagram of a scanner system.

In the exemplary embodiment, the scanner 12 has a housing 14 that supports electronic components, including a processor 16, a memory component 18, a power source 20, an image sensor 22, a light source 24, and a motion sensor 26. These electronic components are generally connected to each other as shown in FIG. 1. In an embodiment, the memory component 18, power source 20, image sensor 22, light source 24, and motion sensor 26 are communicatively coupled to the processor 16, which controls each of the components.

Figure 2:
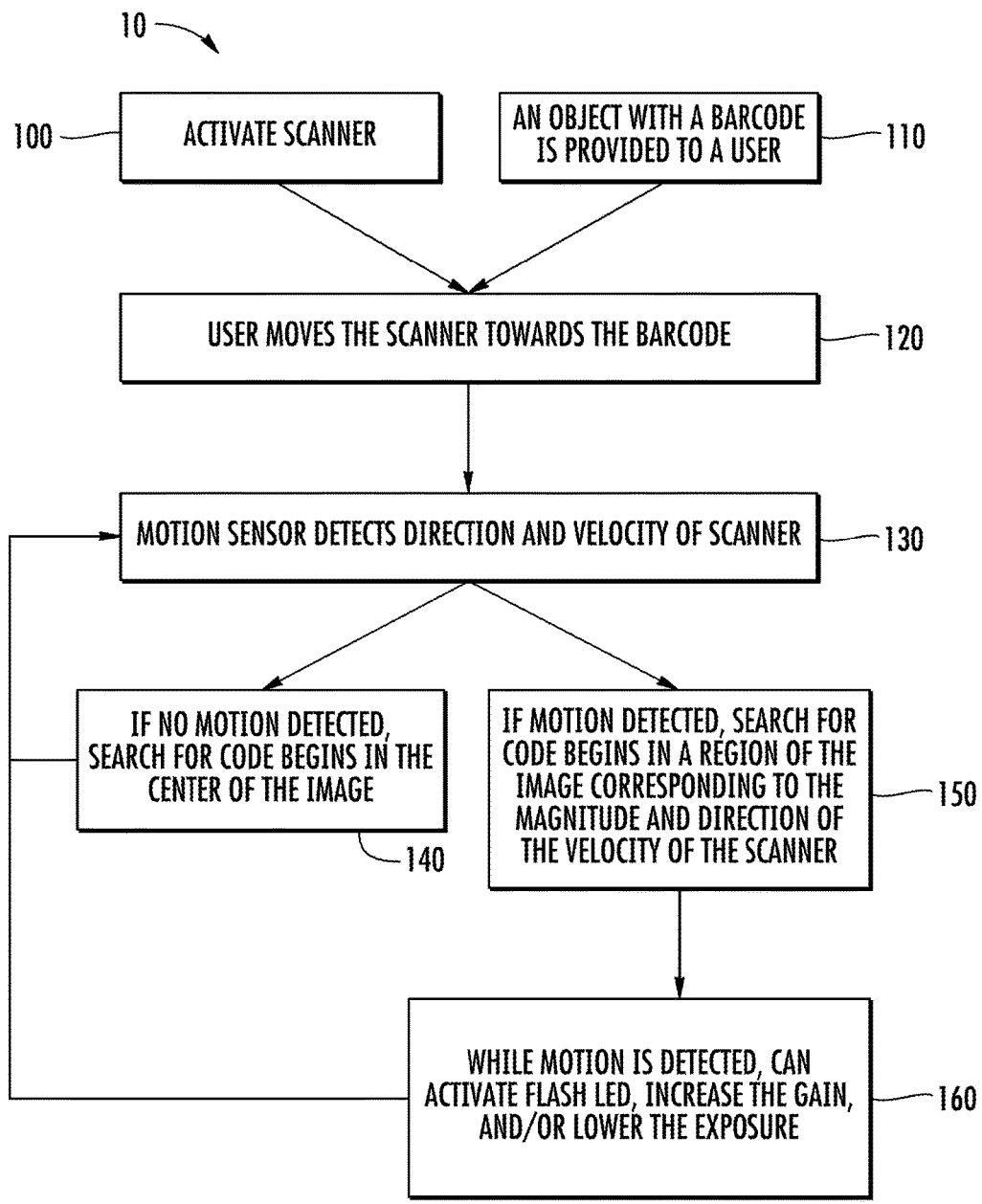
FIG. 2 is a flowchart of a method for predicting the location of a region of interest within an image.

In an embodiment shown in FIG. 2, the acceleration-based motion tolerance and predictive coding method 10 includes the steps of user activating the scanner 12 at 100, and a scannable object having a scannable feature, such as a barcode or other decodable indicia, is provided to the user at 110. The user moves or directs the scanner 12 towards the barcode at 120. The scanner 12 detects relative velocity and direction of the scanner 12 in relation to the scannable object at 130. Based on whether motion is detected, the processor 16 uses an algorithm to run different image code searching procedures. When no motion is detected, the method moves to block 140, where the processor 16 instructs the search for the code to begin at the center of the image. When motion is detected, the method moves to block 150, and the processor 16 instructs the search for the code to begin in a region of the image, with the location of the region corresponding to the magnitude and direction of the velocity of the scanner 12.

To predict the location of a barcode, the method 10 shifts decoding centering coordinates (or the region of interest) in a captured image in the direction of current movement of the scanner housing, and the extent to which the region of interest is shifted is proportional to the velocity. Thus, if a user is moving the scanner 12 quickly to the right, the method 10 includes directing the decoder to search the right edge of a captured image first. If the user is moving the scanner 12 slowly to the right, the decode searches the right half of the captured image first.

Then, while motion is detected, the processor 16 adjusts the lighting (flash LED), the gain, and the exposure settings. After both steps 140 and 160, the processor 16 continues sensing motion of the scanner 12. This allows a user to scan multiple scannable objects sequentially. For example, a user could move a scanner 12 towards a first object, scan the first code on the first object, then move the scanner 12 towards a second object, and scan the second code on the second object. The steps of the method are described in more detail below.

Figure 3:
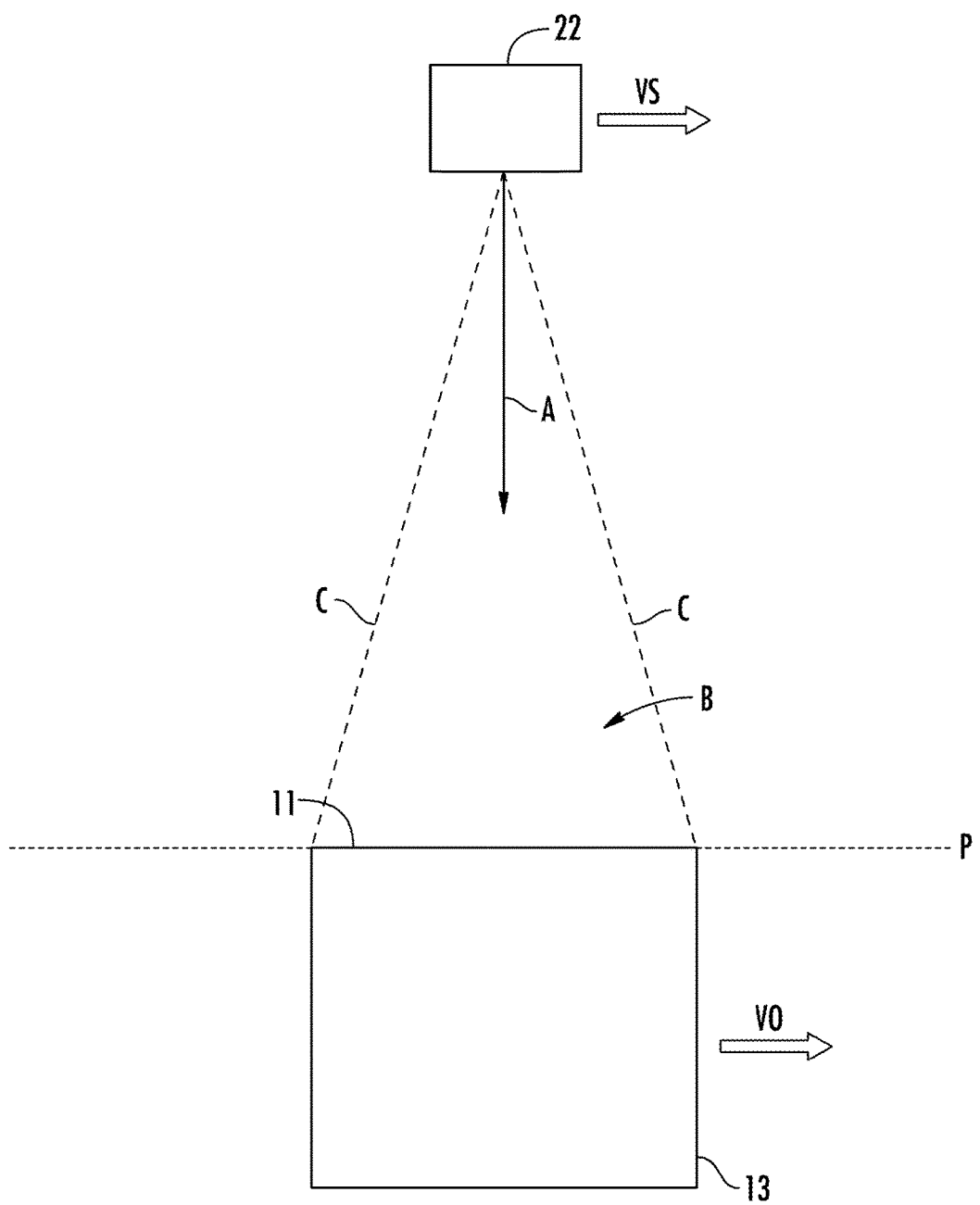
FIG. 3 is a schematic view an image sensor and a scannable object.

In an embodiment shown in FIG. 3, a user directs an image sensor 22 of a scanner 12 towards a scannable object 13. The user activates the image sensor 22 and moves the scanner 12 so that the so that the motion sensors 26 senses the movement and the image sensor 22 is facing in a viewing direction A located towards a scannable surface 11 on the scannable object 13. An imaging plane P is perpendicular to the viewing direction A. The image sensor 22 views a viewing area B that is bounded by edges C.

While the image sensor 22 of the scanner 12 is activated, the motion sensor 26 of the scanner 12 senses motion of the scanner 12 relative to the scannable object. In an embodiment shown in FIG. 3, the sensor 22 has a velocity component VS, and the scannable object 13 has a velocity component VO. These velocity components are parallel to the imaging plane P. The scanner 12 can be configured to detect the relative velocity of the image sensor 22 in relation to the scannable object 13.

The scanner 12 can include a dedicated motion sensor 26 that is connected to the processor 16 and secured to the scanner housing 14. The motion sensor 26 is configured to detect motion of the scanner housing 14 within a motion sensor plane. The motion sensor plane is substantially parallel to the imaging plane P, and is substantially perpendicular to the viewing direction A.

The step of motion sensing produces motion data, which is captured by the motion sensor 26 and output to the processor 16. The motion data includes velocity and movement direction data, with the movement direction corresponding to the velocity.

As shown in FIGS. 4-7, once the velocity and movement direction are known, a region of interest 30 is identified in an image 32 captured by the image sensor 22. The region of interest 30 is a region in which the processor 16 predicts the scannable code will be located, and thus the region of the image in which the processor 16 should begin running the decoding algorithm. The location of the region of interest 30 is defined in response to the velocity and movement direction data.

Once the region of interest 30 is defined, the process of scanning or decoding the captured image 32 (the image being shown in FIGS. 4-7 by its outer boundary) begins in the region of interest 30.

FIGS. 4-7 show the location of the region of interest 30 on an image for various movement conditions. The region of interest 30 is shown as a circular region in FIGS. 4-7 for illustrative purposes only. In other embodiments, the region of interest 30 could be a quadrant, a half, or any other predetermined portion of the image. In further embodiments, the region of interest 30 could be a square, a triangle, a polygon, an oval, or another geometric shape.

Figure 4:
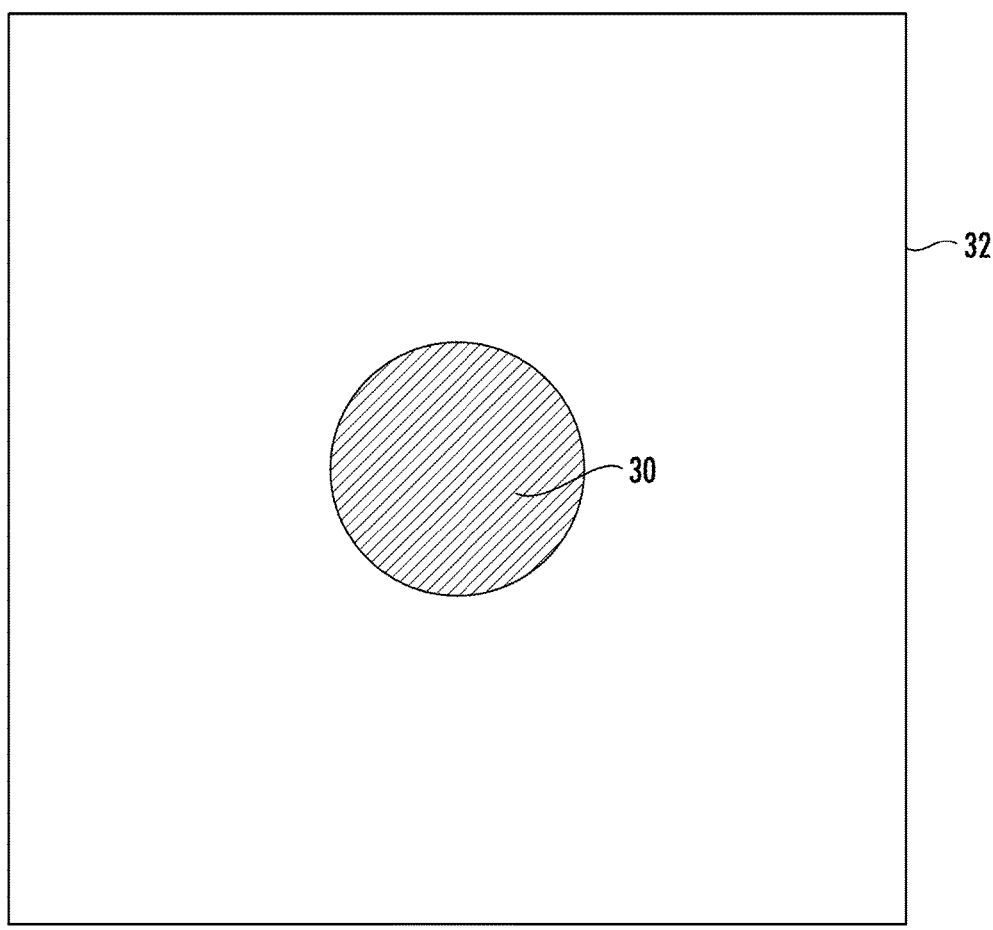
FIG. 4 is a schematic view of a location of the region of interest when no motion is detected by the system.
Figure 5:
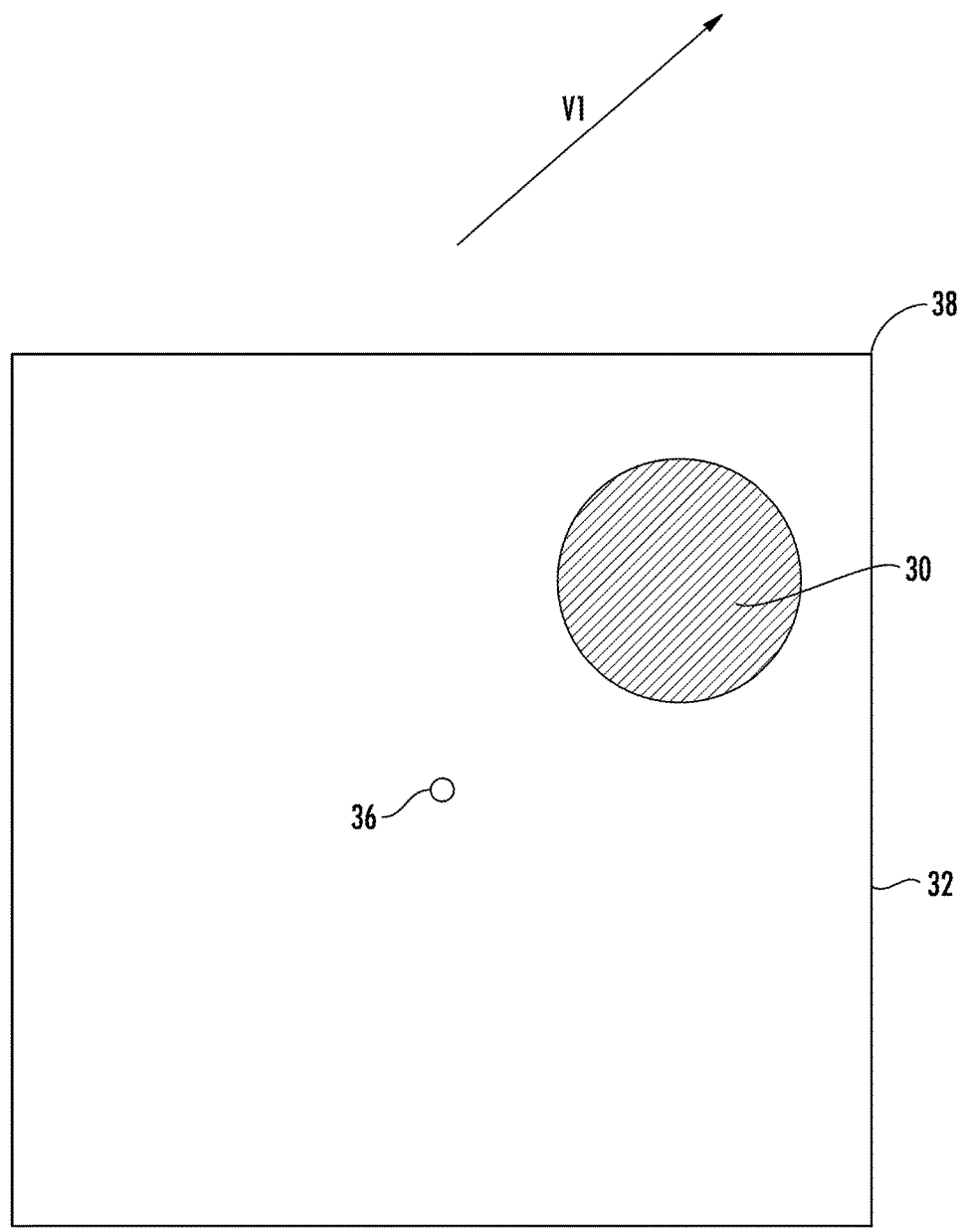
FIG. 5 is a schematic view of FIG. 4, when a first velocity is detected.

In the embodiment shown in FIG. 4, when no motion is detected, the region of interest 30 is located in the center of the captured image 32. When motion is detected, the region of interest 30 is located in an offset direction from the center of the captured image and towards an edge of the captured image 32. The offset direction of the region of interest is substantially parallel or substantially analogous to the movement direction of the scanner 12. For example, as shown in the embodiment of FIG. 5, if the scanner 12 is being moved up and to the right, the region of interest 30 is offset to a portion of the image the corresponds to a portion of the viewing region that is up and to the right. Thus, in the embodiment of FIG. 5, the region of interest 30 is shifted away from the center 36 of the image and toward an upper right corner 38 of the image, where this offset direction corresponds to a relative velocity V1 of the scanner housing relative to the scannable object.

The region of interest 30 can be offset to a generalized quadrant of the captured image 32. Alternatively, when motion is detected, the processor 16 can locate the region of interest 30 at an offset distance measured from the origin, with the offset distance being proportional to the velocity of the scanner 12. For example, the offset distance would be twice as great for a first velocity, than it would be for a second velocity that is half as great as the first velocity. Beyond a threshold velocity, the offset distance would not increase, with the threshold velocity corresponding to a velocity that causes the offset distance to locate the region of interest 30 at the edge of the captured image 32.

Figure 6:
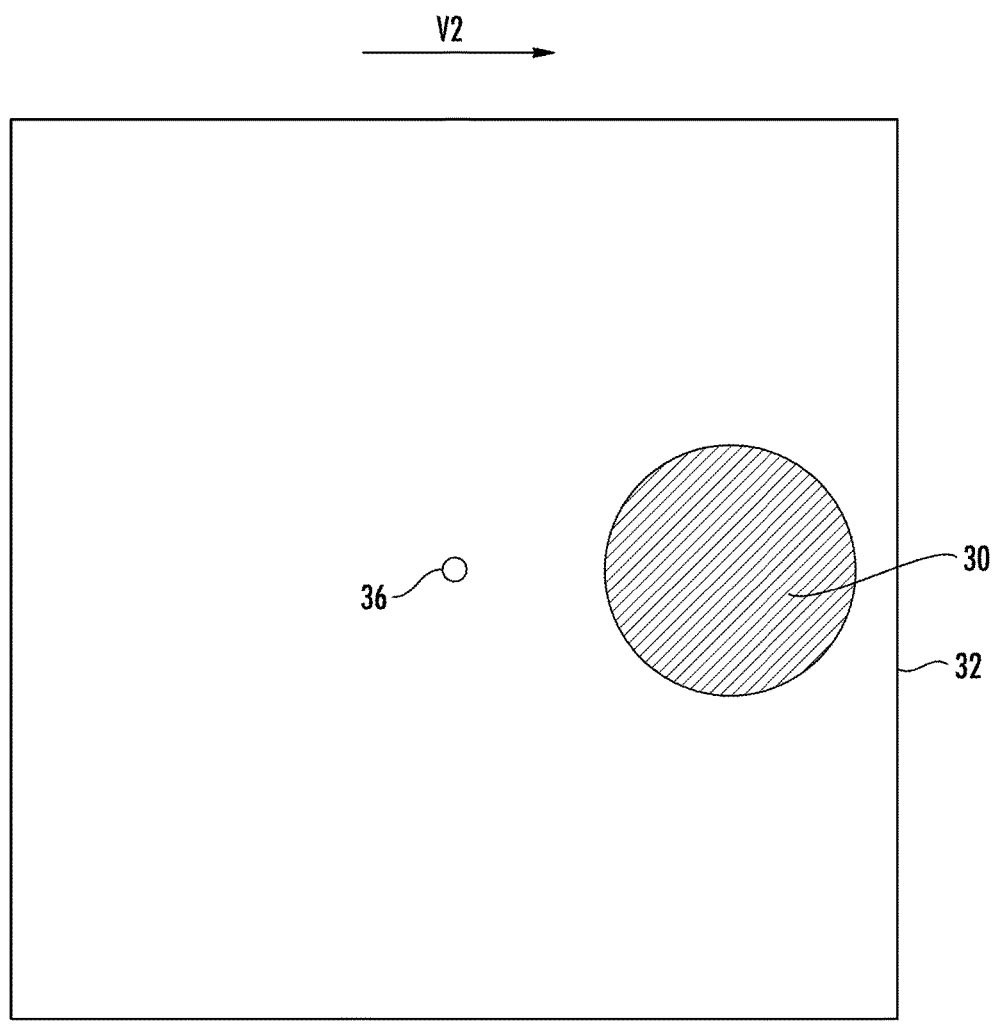
FIG. 6 is a schematic view of FIG. 4, when a second velocity is detected.
Figure 7:
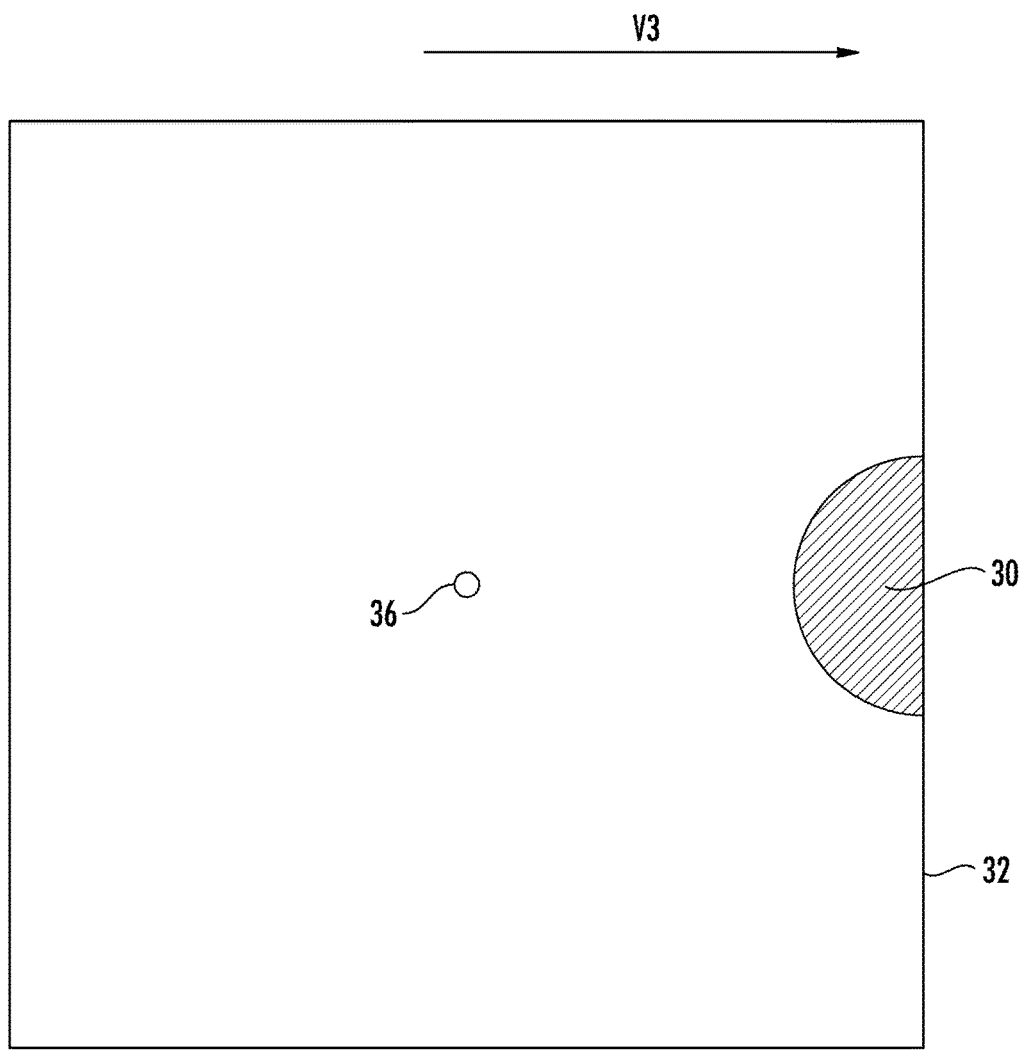
FIG. 7 is a schematic view of FIG. 4, when a third velocity is detected.

FIGS. 6 and 7 show an offset of the region of interest 30 for a velocity V2 in FIG. 6 and a velocity V3 in FIG. 7. Both velocities V2, V3 are substantially to the right, with V3 having a greater magnitude than V2. Because V3 corresponds to a greater velocity of the scanner housing relative to the scannable object, the method offsets the region of interest 30 further to the right than it does in response to velocity V2. FIG. 6 shows the region of interest 30 offset to the right. FIG. 7 shows the region of interest offset to the right further, so that it is adjacent the right edge 40 of the image.

A light source 24 is communicatively connected to the processor 16 and secured to the housing 14. The light source 24 is configured to direct light in and along the viewing direction A. The light source 24 can be selectively switched between a deactivated state and an activated state. In the activated state, the light source 24 provides light. In the deactivated state, the light source 24 does not provide light. In an embodiment, the light source 24 can have one or more intermediate states, in which the light source 24 provides one or more respective intermediate levels of light. The light source 24 is activated when motion is detected by the motion sensor 26. In an embodiment, the light source 24 is a light emitting diode (LED). In another embodiment, the light source 24 is any common light generating device known to those of ordinary skill in the art.

In an embodiment, the velocity of the scanner 12 relative to the scannable object can be calculated or estimated by defining an imaging distance value that corresponds to the distance between the image sensor 22 and the scannable object 13, defining an exposure time for the image sensor 22, and detecting blur in a captured image 32. The image sensor 22 captures at least one image 32 of the scannable object. The processor 16 runs an image processing algorithm that measures a blurred area of the scannable object in the captured image 32. An increased blurred area for a given imaging distance and a given exposure time corresponds to an increased velocity of the scanner 12 relative to the scannable object.

A gain and exposure time of the image sensor 22 are set at appropriate levels based on the velocity detected. If the magnitude of the velocity is great, then the gain is increased and the exposure time is decreased, relative to a zero velocity value.

To increase the likelihood of a successful decode, the method 10 optionally includes the steps of adjusting levels of gain, exposure, and illumination that are applied to the scanning system. For example, if a high degree of motion is detected, a high degree of illumination, a high degree of gain and a low exposure time can be applied to the system. In an embodiment, these settings are applied linearly proportional to the amount of motion detected. In another embodiment, these settings are weighted in either direction, where the system could be configured to be more (or less) aggressive than a linear function would dictate. This exponential approach can be useful to ramp up motion tolerance quickly on even the slightest indication of motion.

Motion can be detected in various ways by the motion sensor 26. In an embodiment, the motion sensor 26 is an accelerometer secured to the scanner housing. A barcode decoding software, such as SwiftMobile, which runs on smart phones and PDTs, employs built in accelerometers which can be used by the decoder or software development kit (SDK). In hand held scanners, there are multiple options, such as adding an accelerometer or another motion sensor to the device.

Other options for hand held scanners are to examine images for evidence of motion. The scanner 12 can detect objects within the captured image 32 and track their movement across multiple images. Based on this information, movement direction and acceleration can be determined for the object. For example, in an embodiment the image sensor 22 captures at least two images of the scannable object, and the images are captured at different times so that there is a time interval that elapses between the times at which the two images are captured. The position of the scannable object is compared between the two images. The velocity can be calculated using both the distance traveled by the object between the two images and the time lapse between the two images.

Additionally, by using images, the processor 16 can run an algorithm that detects motion by inspecting blur in the captured image 32. By using the exposure time and assuming a distance from the camera, velocity can be estimated to perform the above described analysis.

In an embodiment, the above disclosed method 10 allows a scanner 12 to predict the location of a barcode within an image, so the scanner 12 can find and decode the barcode more quickly. Additionally, the scanner 12 can selectively detect motion and account for the motion when needed, thereby achieving high motion tolerance while conserving power consumption. Thus battery life can be extended for portable scanners 12, such as smartphones or other personal electronic devices.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;

U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,525;
U.S. Pat. No. 8,794,526; U.S. Pat. No. 8,798,367;
U.S. Pat. No. 8,807,431; U.S. Pat. No. 8,807,432;
U.S. Pat. No. 8,820,630; U.S. Pat. No. 8,822,848;
U.S. Pat. No. 8,824,692; U.S. Pat. No. 8,824,696;
U.S. Pat. No. 8,842,849; U.S. Pat. No. 8,844,822;
U.S. Pat. No. 8,844,823; U.S. Pat. No. 8,849,019;
U.S. Pat. No. 8,851,383; U.S. Pat. No. 8,854,633;
U.S. Pat. No. 8,866,963; U.S. Pat. No. 8,868,421;
U.S. Pat. No. 8,868,519; U.S. Pat. No. 8,868,802;
U.S. Pat. No. 8,868,803; U.S. Pat. No. 8,870,074;
U.S. Pat. No. 8,879,639; U.S. Pat. No. 8,880,426;
U.S. Pat. No. 8,881,983; U.S. Pat. No. 8,881,987;
U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;

U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;

U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HAND-HELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HAND-HELD DIMENSIONER WITH DATA-QUALITY INDICATION filed Oct. 21, 2014 (Laffargue et al.);
U.S. patent application Ser. No. 14/519,249 for HAND-HELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);
U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

While there is shown and described herein certain specific structure embodying the acceleration-based motion tolerance and predictive decoding method and system, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A method of predicting the location of a region of interest within an image of a scannable object, the method comprising the steps of:

providing a scanner having a processor and an image sensor;

sensing in a viewing direction toward a scannable object, with an imaging plane being perpendicular to the viewing direction;

setting a gain and an exposure time for the image sensor;

capturing an image of the scannable object with the image sensor;

sensing motion of the scanner within a motion sensor plane relative to the scannable object, the motion sensor plane being parallel to the imaging plane, and when motion is detected, either increasing the gain or lowering the exposure time;

outputting a velocity and a movement direction corresponding to the velocity;

locating a region of interest in said captured image in response to the velocity and the movement direction; and scanning the captured image beginning with the region of interest.

2. The method of claim 1, wherein the step of locating the region of interest further comprises:
when no motion is detected, locating the region of interest in the center of the captured image; and
when motion is detected, locating the region of interest in an offset direction from the center of the captured image and towards an edge of the captured image, with the offset direction being substantially parallel to the movement direction.

3. The method of claim 2, wherein the step of locating the region of interest further comprises:
when motion is detected, locating the region of interest at an offset distance measured from the center of the image, the offset distance being proportional to the velocity.

4. The method of claim 1, further comprising the steps of:
providing a light source;
configuring the light source to direct light in the viewing direction;
configuring the light source to be selectively in one of: a deactivated state, and an activated state; and
activating the light source when motion is detected.

5. The method of claim 2, further comprising the steps of:
providing a light source;
configuring the light source to direct light in the viewing direction;
configuring the light source to be selectively in one of: a deactivated state, and an activated state; and
activating the light source when motion is detected.

6. The method of claim 3, further comprising the steps of:
providing a light source;
configuring the light source to direct light in the viewing direction;
configuring the light source to be selectively in one of: a deactivated state, and an activated state; and
activating the light source when motion is detected.

7. The method of claim 1, further comprising the steps of:
defining an imaging distance corresponding to the distance between the image sensor and the scannable object;
defining an exposure time for the image sensor; and
estimating the velocity based on the exposure time and the imaging distance.

8. The method of claim 2, further comprising the steps of:
defining an imaging distance corresponding to the distance between the image sensor and the scannable object;
defining an exposure time for the image sensor; and
estimating the velocity based on the exposure time and the imaging distance.

9. The method of claim 3, further comprising the steps of:
defining an imaging distance corresponding to the distance between the image sensor and the scannable object;
defining an exposure time for the image sensor; and
estimating the velocity based on the exposure time and the imaging distance.

10. The method of claim 2, further comprising the step of:
setting a gain and an exposure time for the image sensor; and
when motion is detected, either increasing the gain or lowering the exposure time.

11. The method of claim 3, further comprising the step of:
setting a gain and an exposure time for the image sensor; and
when motion is detected, either increasing the gain or lowering the exposure time.

12. The method of claim 1, wherein the step of sensing motion further comprises:
capturing at least two images of the scannable object, the at least two images being separated by a time interval; and
determining movement direction and velocity by measuring a distance traveled by the scannable object between the at least two images.

13. The method of claim 2, wherein the step of sensing motion further comprises:
capturing at least two images of the scannable object, the at least two images being separated by a time interval; and
determining movement direction and velocity by measuring a distance traveled by the scannable object between the at least two images.

14. The method of claim 3, wherein the step of sensing motion further comprises:
capturing at least two images of the scannable object, the at least two images being separated by a time interval; and
determining movement direction and velocity by measuring a distance traveled by the scannable object between the at least two images.

15. The method of claim 1, wherein the step of sensing motion further comprises:
capturing at least an image of the scannable object; and
determining movement direction and velocity by measuring a blurred area of a scannable object in an image.

16. The method of claim 2, wherein the step of sensing motion further comprises:
capturing at least an image of the scannable object; and
determining movement direction and velocity by measuring a blurred area of a scannable object in an image.

17. The method of claim 3, wherein the step of sensing motion further comprises:
capturing at least an image of the scannable object; and
determining movement direction and velocity by measuring a blurred area of a scannable object in an image.

* * * * *